United States Patent

[11] 3,575,593

[72] Inventor Lynn A. Staples
Greene, N.Y.
[21] Appl. No. 760,546
[22] Filed Sept. 18, 1968
[45] Patented Apr. 20, 1971
[73] Assignee Singer-General Precision, Inc.
Binghamton, N.Y.

[54] COMPUTER MODULATOR INCLUDING RECTANGULAR-TO-POLAR COORDINATE TRANSFORMATION
7 Claims, 4 Drawing Figs.

[52] U.S. Cl. .................................................. 235/186, 235/189, 328/167
[51] Int. Cl. .................................................. G06g 7/22
[50] Field of Search ........................................... 235/189, 186, 190, 191, 192, 150.26, 150.27; 330/9; 328/165—167

[56] References Cited
UNITED STATES PATENTS

| | | | |
|---|---|---|---|
| 3,187,169 | 6/1965 | Trammell, Jr. et al. | 235/189 |
| 3,270,189 | 8/1966 | Cook | 235/189 |
| 3,312,932 | 4/1967 | Barber et al. | 235/189X |
| 3,430,855 | 3/1969 | Hartwell et al. | 235/189X |
| 3,473,011 | 10/1969 | Schmid | 235/189X |
| 3,482,086 | 12/1969 | Caswell | 235/189X |

Primary Examiner—Malcolm A. Morrison
Assistant Examiner—Joseph F. Ruggiero
Attorneys—Francis L. Masselle and William Grobman ABSTRACT: In spite of the increased use of digital computer systems, simple analog computers still have a place in vehicle trainers, particularly the small vehicle trainers. However, the problem has been to reduce the size of the computers and to improve their expected life and maintainability. The computer modulator of this invention comprises an effective device for producing signals representative of polar coordinates. The device comprises a pair of sin-cos modulators each being controlled by a notched rectangular wave and having applied to it electrical potentials which represent the quantities to be used in a calculation. The notched control wave is so mutilated as to reduce its two major harmonics to a very low amplitude so that the filtering required for the final output signal is at a minimum. The control signal is applied to the primary of a transformer having two secondaries. Each secondary is connected across a transistor to control conduction therethrough, and the potential whose amplitude represents the quantity to be used is applied to one of the primary electrodes of the transistor. In this manner conduction through the transistor of the signal representing the quantity is controlled by the control signal. Each secondary controls a separate transistor so that two input signals are alternately connected to an output. The second portion of the modulator duplicates the first but the two control signals applied to the two portions of the modulator are 90° out of phase. This produces sine-cosine outputs which are combined for application to a filter to produce a single composite sine wave output signal.

*INVENTOR.*
LYNN A. STAPLES

COMPUTER MODULATOR INCLUDING RECTANGULAR-TO-POLAR COORDINATE TRANSFORMATION

This invention relates to computers, and more particularly to a simple and small modulator for analog computers.

Analog computers in the past have comprised large electromechanical devices in which each of the computations is accomplished by synchromotors and other servomotors. Ordinarily, in an electrical analog computer, the input quantities are introduced in the form of a voltage, very often derived from the slide contact of a potentiometer. Since much of the computation in the prior art devices was accomplished by electromagnetic machinery, the prior art analog computers were very often large, cumbersome, and subject to many maintenance problems. It is for these reasons that the digital computer approach to solving problems in simulators has gained much popularity. However, with the newer developments in solid state electronic valves and integrated circuits, newly styled small computers having long trouble-free lives are being developed. One such computer is disclosed in copending patent application Ser. No. 725,706 SIMULATION OF RADIO NAVIGATION EQUIPMENT, filed in the names of George E. Minnich and Lynn A. Staples filed May 1, 1968 now Pat. No. 3,500,439.

It is an object of this invention to provide a new and improved electrical modulator for use in analog computers.

It is another object of this invention to provide a new and improved electronic circuit utilizing modulators for converting analog information from one form to another.

It is a further object of this invention to provide a new and improved modulator for analog computers, which modulator produces output quantities representative of polar coordinates.

Other objects and advantages of this invention will become more apparent as the following description proceeds, which description should be considered together with the accompanying drawings in which.

Figure 1:
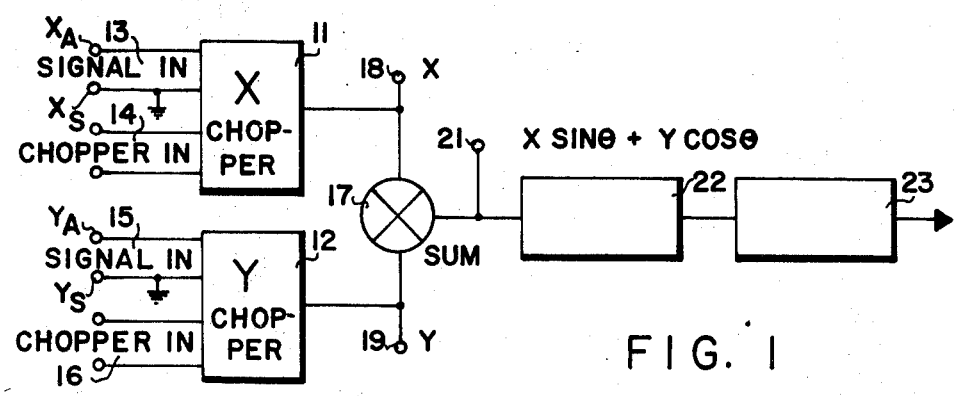
FIG. 1 is a block diagram of the modulator according to this invention.

Referring now to the drawings in detail and more particularly to FIG. 1, the reference character 11 designates a first chopper having two pairs of inputs 13 and 14. A second chopper 12 has two pairs of inputs 15 and 16. The output from the chopper 11 and the output from the chopper 12 are combined in a summing circuit 17, the output of which is applied to the input of a filter 22. The output from the filter 22 is applied through amplifiers, buffers, and amplitude control circuits shown in some detail in FIG. 2 and designated here as a block 23 to produce an output which is equivalent to a constant times an angle. The output from the chopper 11 may be monitored through a terminal 18, the output from the chopper 12 may be monitored through a terminal 19 and the sum output of the two may be monitored through an output terminal 21. The output monitored at the terminal 21 is of the form $X \sin \Theta + Y \sin \Theta$.

Each of the two choppers 11 and 12 receives an input control signal which is proportional to the quantity entering the calculation. The chopper 11, which can be called the X chopper, has its signal input applied to the input terminals 13. This signal can be considered potentials representative of X coordinates and similar signals representative of Y coordinates are applied to the input terminals 15 of the chopper 12, which is shown as the Y chopper. To the other two pairs of terminals 14 and 16, chopper drive or control voltages are applied. A reference control signal voltage is applied to the terminals 14 of the chopper 11 and a control voltage which is shifted by 90° is applied to the input terminals 16 of the chopper 12. Thus, the control signals applied to the two choppers, and the operation of the choppers themselves, are 90° out of phase. For this reason the X chopper 11 is called the sine chopper and the Y chopper 12 is called the cosine chopper.

The outputs from the two choppers 11 and 12 are combined in the summation circuit 17 which can be any suitable circuit for adding potentials. At the terminal 21 the sum signal is still a rectangular wave, but after application to the filter 22, the output which is applied to the amplifier circuit 23 is a sine wave representative in polar coordinates of the same points represented at the inputs at terminals 13 and 15 in rectangular coordinates.

When the input information applied to the input terminals 13 and 15 represent, respectively, the distance along an X axis between two points and the distance along a Y axis between the same two points, then the output from the amplifier 23 is a vector which has a length Z which is the resultant of the two X-Y vectors and which is at an angle $\Theta$ with the X axis. Thus, given the X and Y distances of two objects, say an aircraft approaching a ground station or airport, the modulator shown in FIG. 1 produces an output signal whose amplitude is representative of the vector distance between the aircraft and the airport and whose phase angle is proportional to the direction between the aircraft and the airport.

Figure 2:
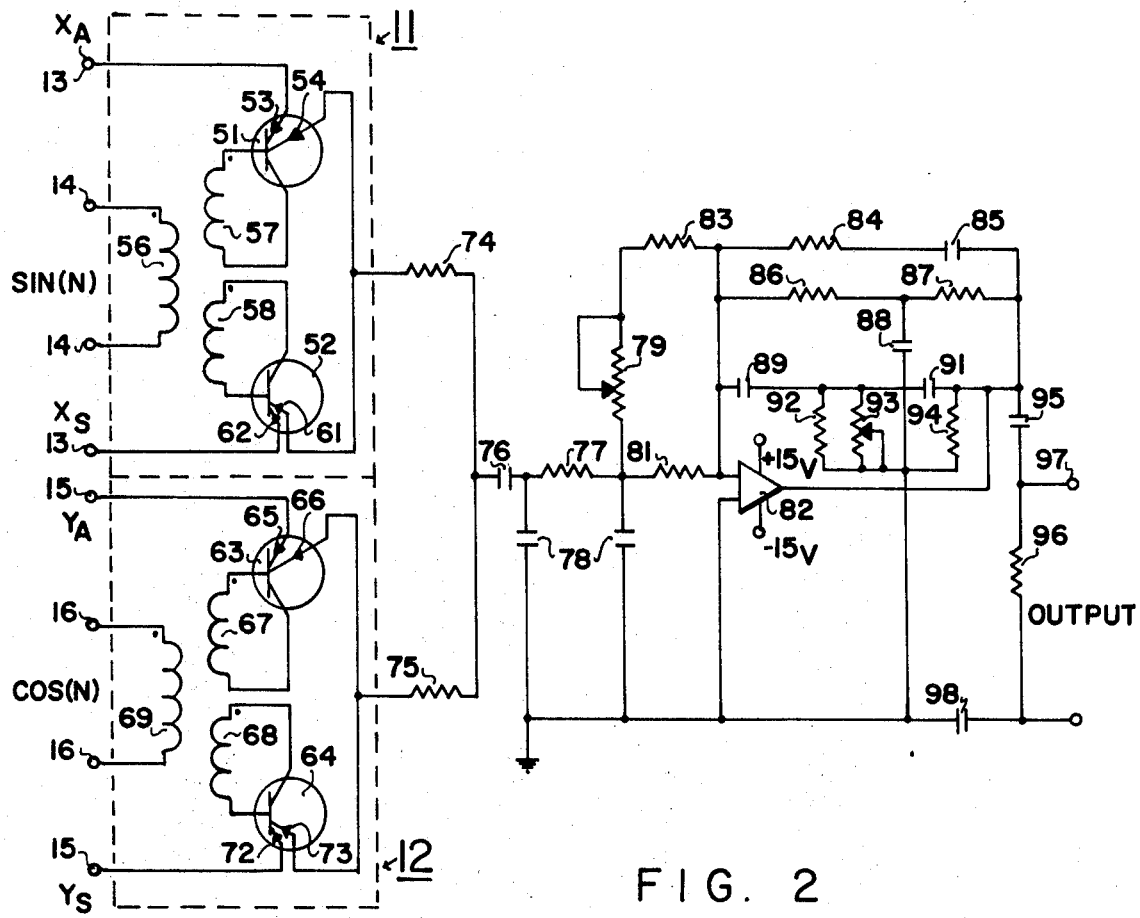
FIG. 2 is a schematic wiring diagram of the modulator shown in FIG. 1.

A circuit wiring diagram of one form that the system of FIG. 1 could take is shown in FIG. 2. The reference character 11 designates the X chopper just as it did in FIG. 1. The chopper 11 is shown comprising a pair of four electrode transistors 51 and 52. The transistor 51 comprises a pair of emitter electrodes 53 and 54, a base electrode and a collector electrode, with the base electrode connected to one side of a transformer secondary 57, the other side of which is connected to the collector electrode. Similarly, the transistor 52 comprises a pair of emitter electrodes 61 and 62, a collector electrode connected to one side of a secondary 58 the other side of which is connected to a base electrode. A single transformer primary 56 having the input terminals 14 energizes the two secondaries 57 and 58. The two X coordinates applied to the modulator 11 are applied to the individual signal input terminals 13. The other chopper 12 is similarly formed comprising a transistor 63 having a pair of emitter electrodes 65 and 66, a base electrode connected to one side of a transformer secondary 67 and a collector electrode connected to the other side of that secondary. The chopper 12 also comprises a transistor 64 having a pair of emitter electrodes 72 and 73, a base electrode connected to one side of a secondary 68 and a collector electrode connected to the other side of the secondary 68. A single primary winding 69 having input terminals 16 energizes the two secondaries 67 and 68. The two input terminals to which the signals are applied in chopper 11 are connected to one of the emitter electrodes 53 and 62 of the transistors 51 and 52. The two Y signal output terminals 15 are connected to the two emitter electrodes 65 and 72 of the two transistors 63 and 64. The outputs from the two transistors 51 and 52 of the chopper 11 are taken from the two other emitter electrodes 54 and 61 which are connected together and to one side of a summing resistor 74. The output from the chopper 12 is taken from the emitter electrodes 66 and 73 of the transistors 63 and 74. The emitter electrodes 66 and 73 are connected together and to one side of a summing resistor 75. The other sides of the two summing resistors 74 and 75 are connected together and to one side of the Butterworth filter 22. The circuit diagram of FIG. 2 shows the Butterworth filter combined with the amplifier 82 and the gain controls 79 and 93 (which are normally contained in the block 23) in such a manner that they are not readily distinguishable from each other. For this reason they are not independently shown as separate blocks 22 and 23 in FIG. 2.

However, the input to the filter comprises a capacitor 76 which is connected in series with a resistor 77. Connecting the two sides of the resistor 77 to ground a pair of capacitors 78. A resistor 81 connects one side of the resistor 77 with one input to the operational amplifier 82, the other input to which is grounded. The feedback path of the operational amplifier 82 includes a complex network which comprises, in a first path, the series arrangement of capacitors 89 and 91, and in a second path, the series arrangement of resistors 86 and 87 and, in a third path, the series arrangement of a resistor 84 and a capacitor 85. The junction of the resistors 86 and 87 are connected through a capacitor 88 to ground. One side of capacitor 91 is connected to one side of a resistor 94 the other side of which is grounded, and the other side of the capacitor 91 is connected to one side of a resistor 92 and one side of a potentiometer 93, the other sides of which are grounded. The slide of the potentiometer 93 is also grounded. The three parallel paths mentioned above are connected together and to the input to the operational amplifier 82 at one side of the resistor 81. Connected across the resistor 81 is a resistor 83 in series with a potentiometer 79. The slide of the potentiometer 79 is connected to one end thereof. The output from the system is taken across a resistor 94 which is connected at one end to one side of a capacitor 98 whose other side is grounded, and the other end to one side of a capacitor 95 the other side of which is connected to the output of the amplifier 82.

The operation of the circuit shown in FIG. 2 has been explained in broad terms in connection with the description of FIG. 1. However, the operation of the choppers 11 and 12 will be explained in a bit more detail. Two control voltages are applied to the input terminals 14 and 16 of the primary windings 56 and 69. Assume, for this discussion, that the input applied to the terminals 14 of the primary 56 is a reference potential, and is designated sin($n$). The control signal input to the terminal 16 of the primary winding 69 is shifted in phase 90° from the reference control signal and is designated cos($n$). Thus, the two control signals are applied in quadrature. The transistors 51, 52, 63 and 64 have the control signals applied across their base and collector electrodes. The input signal is applied to one emitter electrode and the output is taken from the other emitter electrode of each transistor. When the transistors are PNP, as are those shown, positive potentials applied to the base electrodes with respect to the collector electrodes causes conduction in the transistors and, essentially, short circuits together the two emitter electrodes in each. Thus, when the top part of the secondary winding 57 becomes positive, conduction is established in transistor 51, and the two emitter electrodes 53 and 54 are connected together to transmit the input signal applied to the top terminal 13 to the resistor 74. The operation of the system is such that the base electrode of transistor 51 is positive for one half-cycle and the base electrode of transistor 52 is positive for the other half-cycle. The same situation is true with respect to transistors 63 and 64. However, since the input signal applied to the primary winding 69 is 90° shifted from the input control signal applied to primary winding 56, the base electrode of the transistor 63 becomes positive 90° later than the base electrode of the transistor 51. Thus, the sequence of events is something like the following: (1) At 0° transistor 51 becomes conductive; (2) At 90° transistor 63 becomes conductive; (3) At 180° transistor 52 becomes conductive and transistor 51 becomes nonconductive; (4) At 270° transistor 64 becomes conductive and transistor 63 becomes nonconductive. At any time one transistor from chopper 11 and one transistor from chopper 12 are simultaneously conducting. The combination of conducting transistors, however, changes every 90°.

If, for this discussion, it is assumed that the signal inputs being applied to the modulator of this system represent the rectangular coordinates of an aircraft and an airport, a signal representative of the X coordinate of the aircraft would be applied to the top terminal 13 and a signal representative of the X coordinate of the airport or ground station would be applied to the lower terminal 13. In the same manner, a signal representative of the Y coordinate of the aircraft would be applied to the upper terminal 51, and a signal representative of the Y coordinate of the ground station would be applied to the lower terminal 15. For 90° a modulated signal having an amplitude proportional to the X coordinate of the aircraft is applied to resistor 74 and a modulated signal having an amplitude representative of the Y coordinate of the aircraft is applied to the resistor 73. These two signals are summed and applied to the input of the filter. 90° later the signal applied to the resistor 74 is a modulated signal having an amplitude representative of the X coordinate of the ground station while the signal applied to the resistor 75 remains the same as before. These two signals are now summed and applied to the input of the filter. Thus, the modulated signals carrying information which represent the X and Y coordinates of the aircraft and the ground station are combined in the modulator of this system. The net result is a signal whose information represents the distance between the aircraft and the ground station and the direction from one to the other. As indicated in FIG. 1 the signal output at terminal 21 can be represented by X sin $\Theta$+Y cos $\Theta$. However, when this signal is applied to the filter, it is converted into a single sine wave amplitude is proportional to the distance between the aircraft and the ground station and whose phase angle with respect to the control signal applied to terminals 14 represents the heading from the aircraft to the ground station. The heading is indicated from the point whose X coordinate is applied to the top terminal 13, which is the 0° or reference terminal.

Figure 3:
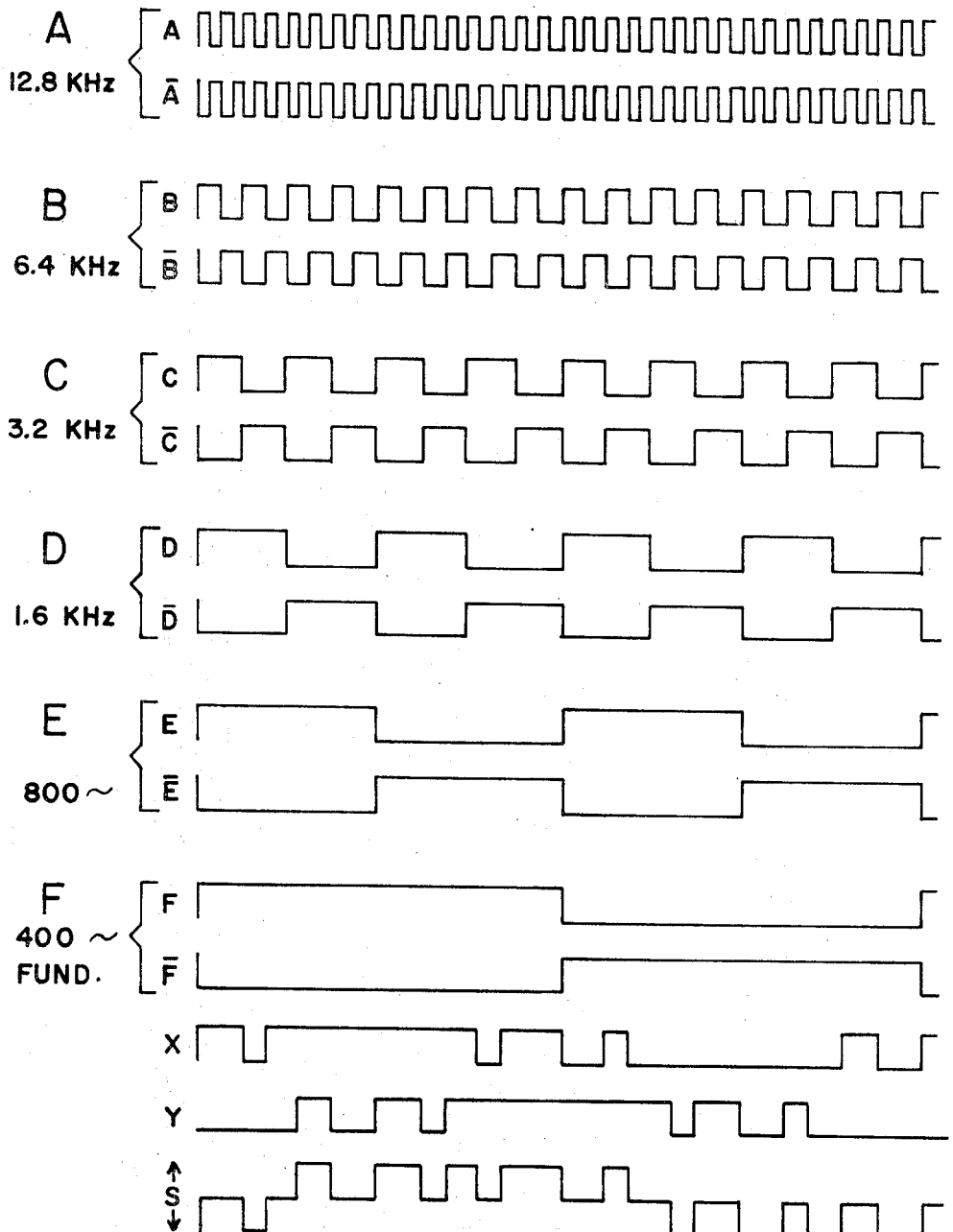
FIG. 3 is a series of curves representing the mutilated square wave and its development.

The filter shown in FIG. 2 is a comparatively simple filter when it is considered that a rectangular wave, and this is what is applied to the control terminals 14 and 16, contains a fundamental and a strong third and fifth harmonic. In order to avoid the requirement of a large filter to produce a reasonably pure sine wave output at terminals 97, the input control signals applied to the terminals 14 and 16 have been notched or mutilated in order to remove, as much as possible, the strong third and fifth harmonics. The manner in which this is accomplished is shown on FIG. 3. A square wave generator, such as a standard free-running multivibrator operating at a frequency of 12,800 cycles per second, generates the waveform shown in FIG. 3A. At the top of FIG. 3A is a scale representing a complete cycle of the fundamental wave with degree markings at appropriate spots. From this it can be seen that one cycle of the square wave of curve A occupies approximately 11.25° of the final fundamental signal. THe output from the free-running multivibrator is applied to the input of a binary counter stage, and the output of the counter stage is a square wave having a frequency one-half that of the original signal, or 6,400 cycles per second as shown in curve B. In all of these curves both sides of the multivibrator output are shown. This produces two waves for each curve, one 180° out of phase from the other. In a similar manner the outputs from the binary counter stages producing frequency of curve B are applied to binary counter stages which produce the outputs of curve C. This in turn is applied to another binary counter stage, and so on until the signal has been stepped down, or halved, at each step to produce a fundamental signal shown in curve F of 400 cycles per second. A Fourier analysis of the fundamental wave shown in FIG. 3F indicates that if the wave shown in curve F is reduced to zero at 23.62° and permitted to return to its maximum potential at 33.3° on either side of 0° point of the fundamental and 180° point of the fundamental, the effect of the third and fifth harmonics will be virtually eliminated. For ease in accomplishing this, the values of 22.5° and 34.75° were selected to represent the point at which the amplitude is decreased to zero and then increased to its maximum potential. As shown in FIG. 3, the signal B has a full cycle which occupies approximately 22.5°. Thus, the signals shown in curves B and C can be used to control SCRs, or the like, to permit conduction or nonconduction at prescribed points of the fundamental wave shown in curve F of FIG. 3. The net result is shown in curves X and Y of FIG. 3 where curve X is the reference notched rectangular wave applied to the input terminals 14 of FIGS. 1 and 2 and where Y is the quadrature rectangular wave applied to the input terminals 16 of FIGS. 1 and 2. When these two signals are combined, a wave having the general shape shown in curve S of FIG. 3 results. This is what is applied to the input of the filter when the amplitudes of the X and Y coordinates are the same. Of course, variations in the amplitudes of these signals will change the shape of the curve shown in FIG. 3S.

Removing the third and the fifth harmonic from a rectangular wave, which contains only odd harmonics to begin with, leaves only those harmonics starting with the seventh and going higher. The relative amplitudes of the seventh and higher harmonics are quite small, and they are readily eliminated by a comparatively small filter such as that shown in FIG. 2. The filter of FIG. 2 comprises an RC arrangement feeding an operational amplifier 82 which has a plurality of feedback paths so designed as to eliminate the remaining harmonics. Since this is an active filter, the variations in input signals will modify the feedback potentials which, in turn, serve to modify the operational characteristics of the entire filter. The utilization of the potentiometers 79 and 93 controls these characteristics to a limited extent. The net result is a sine wave output at the terminals 97 which has an amplitude proportional to the length of the resulting vector and a phase angle with respect to the reference signal applied to the input terminals 14 which is proportional to the heading or direction between the two input signals.

Figure 4:
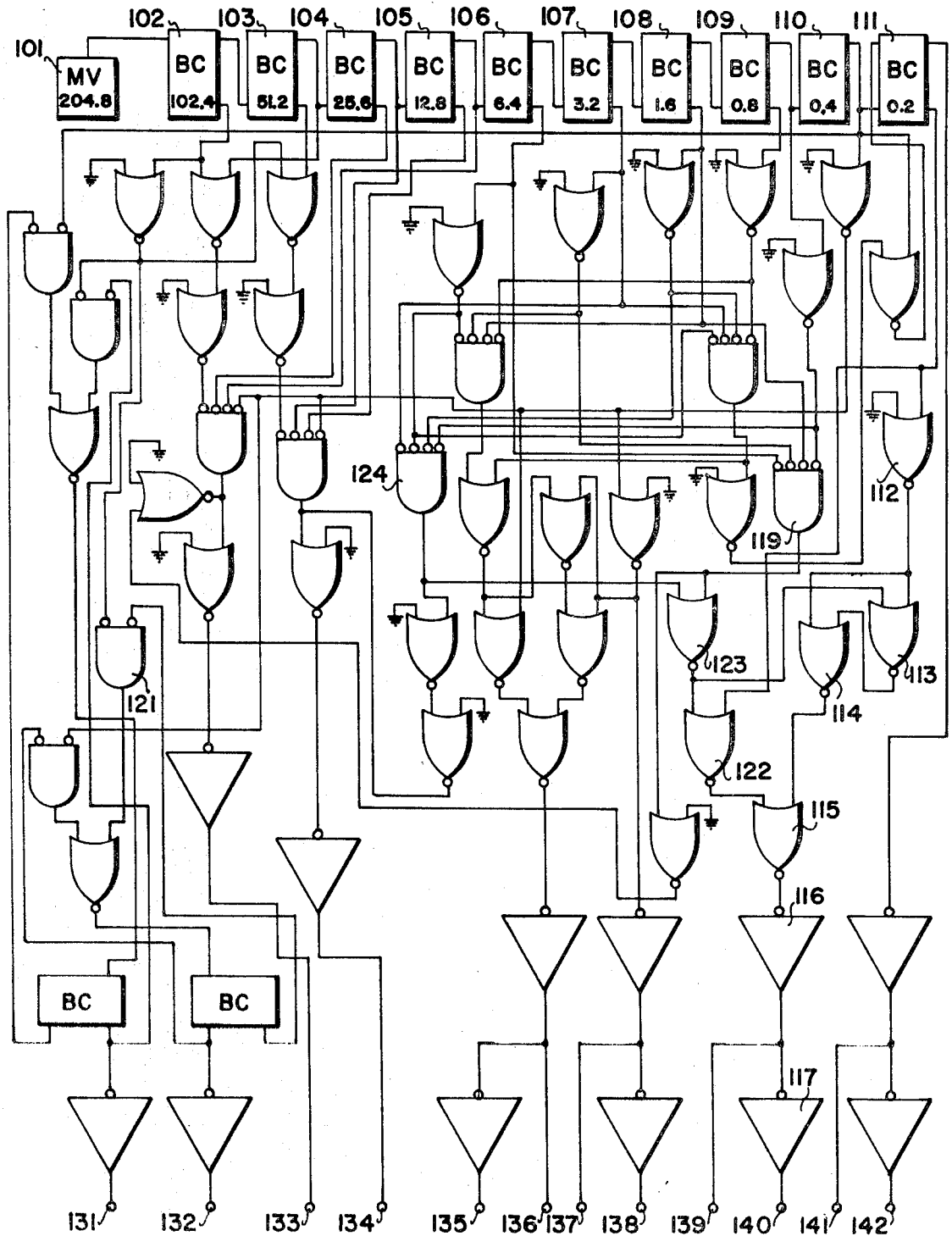
FIG. 4 is a block diagram of a device for producing notched waves.

One apparatus for generating a notched wave form of the type used in the modulator of this invention and applied to the input terminals 14 and 16 is shown in block form in FIG. 4. A square wave is initially generated by a multivibrator 101. The frequency output of the multivibrator 101 is, for this discussion, 204.8 kilocycles per second. This square wave is then applied to a binary counter comprising stages 102, 103, 104, 105, 106, 107, 108, 109, 110 and 111. Each stage 102—111 of the binary counter has a single input and is capable of two outputs which are 180° out of phase. Thus, for every two input pulses a single output pulse on one of the output lines is generated by each binary counter stage. Each counter stage can be considered a frequency divider dividing the input frequency by two. The output from stage 110 has a frequency of 400 cycles per second. As shown in FIG. 4, the top output of each binary stage can be considered the true signal and an output from the bottom of each binary counter stage can be considered the false signal. Other terms for these two signals are 1 and 0, high and low, go and no-go, etc. The individual outputs, both true and false, of the several binary counter stages 102—111 are combined in a group of NOR gates such as 112, 113, 114 and 115, amplifiers such as 116 and 117 and gates such as 119 and 121 to produce the several output signals desired. To achieve any of the output signals which appear at terminals 131, 132, 133, 134, 135, 136, 137, 138, 139, 140, 141 and 142 various combinations of NOR and coincidence gates are used. Since many of the combinations are rather complex having a plurality of inputs, they will not be described or discussed in detail. As one example, however, the notched 400 cycle waves are produced at terminals 139 and 140. The difference between these two waves is that one is 180° out of phase with the other and this is produced by the use of an additional amplifier 117, each of the two amplifiers 116 and 117 inverting the signal. The input to the amplifier 117 is supplied by a NOR gate 115 which has two inputs, one from a NOR gate 114 and the other from a NOR gate 122. The inputs to the NOR gate 114 are derived from NOR gates 113 and 112, and the inputs to the gate 113 are supplied by the outputs of the NOR gate 112 and by a NOR gate 123. One input to gate 112 is grounded and the other comes from the false output of the binary counter stage 111. The two inputs to the NOR gate 123 are derived from a coincidence gate 119 and a coincidence gate 124, each of the two coincidence gates 119 and 124 has four inputs. Rather than trace all four of the inputs and complicate and extend this description with a detailed recitation of all of the individual circuits shown in FIG. 4, it is mentioned that, if necessary, a tracing of any individual path to obtain the combinations necessary to produce a particular output is readily achieved by anyone in the art. FIG. 4 is complete and easily followed and a detailed description is not considered necessary in this application. A small circle adjacent an input or output of a gate indicates that input or output is low when passing a signal. Thus, considering the gate 119, only when all four input lines are low is the output line high. From this it can be seen that a 400-cycle per second square wave applied to a gate can be notched by the application of lower frequency signals in the right phase.

The above specification has described a new and improved modulator which can be used in simple analog computers to convert rectangular coordinates into polar coordinates and which simplifies subsequent computations. The apparatus described is simple and inexpensive to build and requires very little maintenance. It has particular utilization in the types of computers which are often used in vehicle simulators. It is realized that the above description may indicator to others skilled in the art additional ways in which this invention may be utilized without departing from its principles. It is, therefore, intended that this invention be limited only by the scope of the appended claims.

I claim:

1. A converter for converting information in rectangular coordinate form into information in polar coordinate form; said converter comprising a first modulator; said first modulator having a first information input for receiving information representing a first rectangular coordinate of a first point, a second information input for receiving information representing a first rectangular coordinate of a second point, and a first control input for receiving a first alternating signal; a second modulator; said second modulator including a third information input for receiving information representing a second coordinate of said first point, a fourth information input for receiving information representing a second coordinate of said second point, and a second control input for receiving a second alternating signal which is out of phase with said first alternating signal; means for combining the outputs from said first and second modulators; and means for filtering the combined output signals.

2. Apparatus for performing vector algebra computations, said apparatus comprising a first chopper and a second chopper, each of said first and second choppers including means for applying a first alternating input signal representative of angular information and means for applying second input signals representative of magnitude information, each of said first and second choppers operating to multiply said magnitude and angular information, the angular information applied to said first chopper being shifted by a fixed amount from that applied to said second chopper, and means for adding together the outputs of said first and second choppers said first alternating signal comprising a voltage wave having a generally square wave-shape which is mutilated to remove the third and fifth harmonics, the first signal applied to said first chopper being in quadrature with that applied to said second chopper.

3. The apparatus defined in claim 2 wherein said first and second choppers each includes a pair of electronic switches, means for applying said first alternating signal to said switches to drive said switches open and closed, and means for connecting said magnitude information to said switches so that said magnitude information is connected from said inputs to said outputs whenever said switches are closed.

4. The apparatus defined in claim 3 wherein said first alternating signal is applied to the two switches of each pair of switches in opposition so that only one switch of a pair is closed at any time.

5. The apparatus defined in claim 4 wherein said adding means comprises means for adding together the outputs from said two switches of each pair and means for adding together the outputs from said two choppers.

6. The apparatus defined in claim 5 further including means for filtering the output of said adding means to recover a signal having a generally sinusoidal form whose amplitude is proportional to the magnitude of a vector which is the algebraic vector summation of the magnitude information applied to said choppers and whose phase relationship with respect to that of the first signal applied to said second chopper is proportional to the vector algebraic summation of the angular information applied to said choppers.

7. The apparatus defined in claim 3 wherein said switches comprise electronic discharge devices each having a main conduction path, and means for controlling the conduction through said main conduction path, said angular information being applied to said means for controlling said main path and said magnitude information being applied to said main path.